No. 653,500. Patented July 10, 1900.
S. M. BOYER.
WATER FILTER.
(Application filed Feb. 28, 1900.)

(No Model.) 2 Sheets—Sheet 1.

WITNESSES:

INVENTOR
Seaton M. Boyer
BY
ATTORNEYS

No. 653,500. Patented July 10, 1900.
S. M. BOYER.
WATER FILTER.
(Application filed Feb. 28, 1900.)
(No Model.) 2 Sheets—Sheet 2.

WITNESSES:

INVENTOR
Seaton M. Boyer
BY
ATTORNEYS

UNITED STATES PATENT OFFICE.

SEATON M. BOYER, OF ALLENTOWN, PENNSYLVANIA.

WATER-FILTER.

SPECIFICATION forming part of Letters Patent No. 653,500, dated July 10, 1900.

Application filed February 28, 1900. Serial No. 6,793. (No model.)

*To all whom it may concern:*

Be it known that I, SEATON M. BOYER, a citizen of the United States, residing at Allentown, in the county of Lehigh and State of Pennsylvania, have invented certain new and useful Improvements in Water-Filters, of which the following is a specification.

This invention relates to water-filters, and particularly to that class of water-filters which are provided with agitating devices for the filtering material, whereby the foreign bodies detained by the filtering material during filtration are detached and loosened up, so that they will be carried off when cleaning out the filter by a reverse flow of water.

The object of the invention is to provide an effective, simple, and convenient means of agitation adapted to be worked by a simple hand manipulation.

My invention consists, broadly, of a water-filtering tank having an inlet and an outlet, a horizontal shaft journaled in said tank and bristling with a number of radial arms, and means for oscillating said shaft, as will be hereinafter fully described in detail and then pointed out in the claims.

Figure 1:
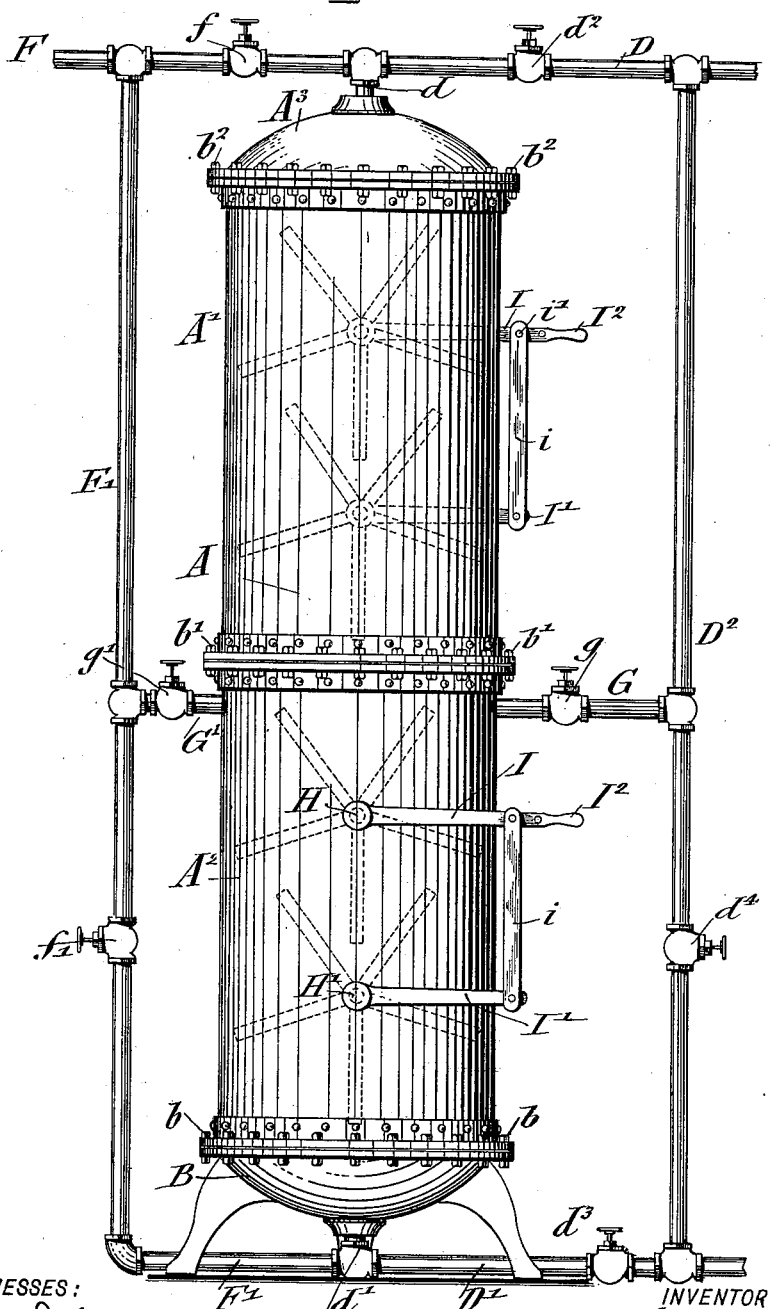
Figure 2:
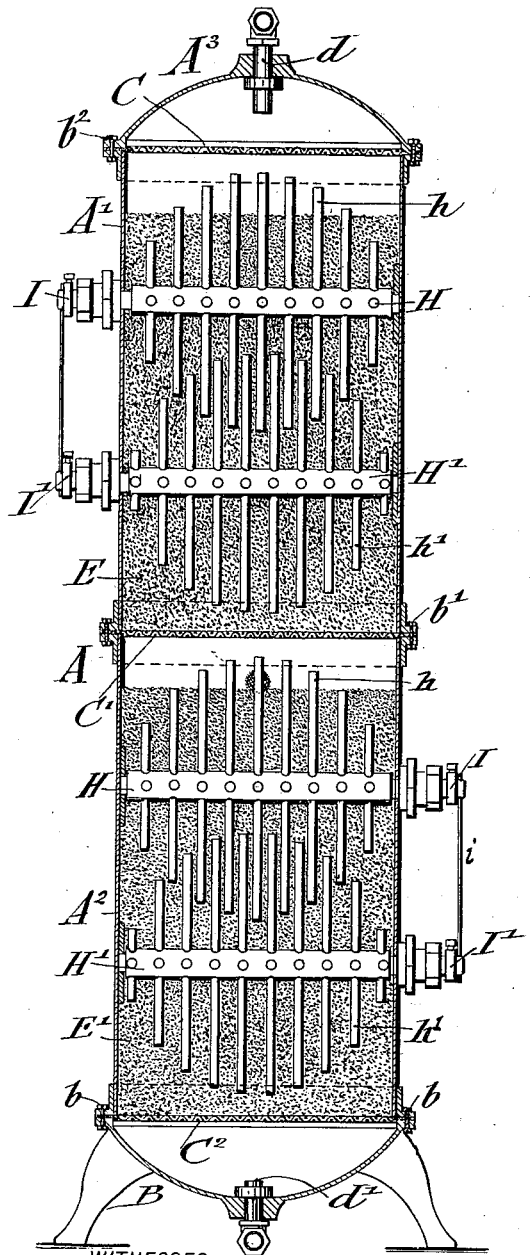
Figure 3:
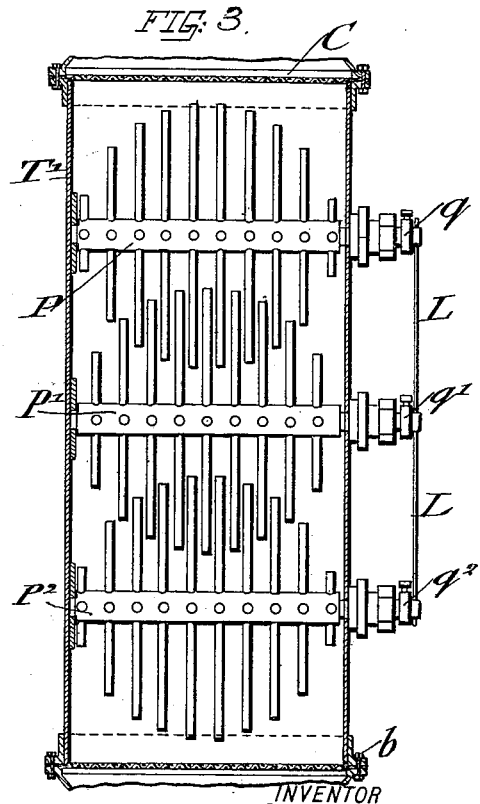

In the accompanying drawings, Figure 1 is a side elevation of my improved water-filter. Fig. 2 is a central vertical section of the same, and Fig. 3 is a broken sectional view showing a modified form of agitating device.

Similar letters of reference indicate corresponding parts.

In the main form of the invention shown in Figs. 1 and 2, A indicates the filtering-tank, which is composed of an upper cylindrical section A' and a lower cylindrical section $A^2$, said lower section being flanged at the lower end and connected to a flanged base B by means of bolts $b$, said lower section $A^2$ being also flanged at top and connected to the flanged lower end of section A' by bolts $b'$ and said upper section being flanged at top and having secured thereto by bolts $b^2$ a top plate $A^3$.

The inlet and outlet pipes are so arranged that one section of the filter may be used at a time or both together.

D indicates the inlet-pipe for the water from the street—that is, for the unfiltered water—said pipe leading by a branch $d$ into the top of the filtering-tank and discharging thereinto just above a screen C, which detains chips, heavy fibers, &c. Another intermediate screen C' is arranged between the two cylindrical sections A' $A^2$, and a filtering mass E is supported thereon, while still another screen $C^2$ is arranged at the lower end of the section $A^2$, upon which screen $C^2$ is supported another filtering mass E', both masses being composed of loose particles of material, such as charcoal. The outlet-pipe D' for filtered water connects with the base B by means of a branch pipe $d'$, and the two pipes D D' are connected by an outside pipe $D^2$, the pipes D D' $D^2$ being provided with stop-cocks $d^2$ $d^3$ $d^4$, respectively. Branch pipe $d$ connects also with an outlet-pipe F for impure water, which pipe F is provided with a stop-cock $f$, while a pipe F' connects the pipe F with the branch pipe $d'$ at the bottom of the filtering-tank, said pipe F' having a stop-cock $f'$. Branch pipes G G' extend from the upper end of the tank-section $A^2$ below the screen C' and connect, respectively, with the upright pipes $D^2$ F' above their stop-cocks $d^4$ $f'$ and are provided with stop-cocks $g$ $g'$.

By means of the described pipe system the water to be filtered may be passed down through the filtering material in both sections of the tank or through one or the other section and then pass out through the pipe D' for pure water, while for cleaning the filtering material of accumulations by a reverse flow the water may be caused to pass upwardly through both or through either section, the proper stop-cocks in all cases, however, being opened and closed in evident manner.

The means for agitating or stirring up the filtering material comprises a pair of horizontal shafts H H', journaled in each tank-section and provided with a number of radial agitator-arms $h$ $h'$, respectively, which are gradually shorter toward the ends of the shafts and are longer at the central portions of the shafts, so that those on one shaft can pass between the arms on the shaft. Said arms extend all around the shafts, so that each shaft fairly bristles with them.

For oscillating the agitator-shafts H H' levers I I' are applied, respectively, to the projecting outer ends of the same, one of said levers being elongated to provide a handle $I^2$ and both being connected by a pivoted link $i$. A simple up-and-down motion imparted to hand-lever I I² will oscillate the coacting pair of agitators and cause the arms thereof to stir up the filtering material and detach or loosen therefrom the foreign matters detained or filtered out of the water. First the lower mass of filtering material may be cleansed and then the upper mass, this being done by opening and closing the proper stopcocks during the upward flow of the water.

It will be understood that during the time the water is being filtered the coarser particles and foreign matter that are not held by the screen C will be detained by the filtering material at the upper part of the tank. If during the cleaning process the pin $i'$ that holds the lever that is connected with the upper agitator is removed, this agitator can be worked independently, so that the coarser particles and foreign matter are gotten rid of before the lower part of this section is at all agitated. This is when more than one agitator is placed in one section.

In Fig. 3 the filtering-tank T' contains three agitators P P' P², constructed the same as those before described, but all three having their central arms long enough to overlap or pass each other, and the levers $q$ $q'$ $q^2$ on the shafts of which agitators being connected by links L for simultaneous oscillation of the agitators. In all forms of the invention, in which a filtering mass is inclosed between two screens, the radial arms of the agitators extend away from their shafts, so that at intervals during the movement of the agitators said arms point directly from the shafts toward the screens, whereby they are brought in line with the flow of the water, which passing from the direction of the shaft toward the outer extremities of the arms strips or removes any accumulation from the arms. These agitators can readily be applied to filters of the same type shown, as it is only necessary to mount the bearings at different parts of the tanks or sections before putting in the agitator. Consequently the agitating mechanism can be sold either together with the other parts of the filtering apparatus or independently.

The water-filter described is very efficient for filtering water and requires very little work to clear the filtering material of foreign matters, as the reversal of the flow of the water during a few oscillations of the agitators thoroughly separates the said foreign matters from the filtering material.

Having thus described my invention, I claim as new and desire to secure by Letters Patent—

1. A water-filter, consisting of a tank provided with an inlet and outlet, means for reversing the flow of water through the inlet and outlet, screens contiguous to the inlet and outlet, a mass of filtering material confined between said screens, a pair of oscillatory shafts journaled in said tank, in bearings located between the screens, one shaft being located nearer one screen than the other, and said shafts being provided with radial agitator-arms, and means for oscillating said shafts, substantially as set forth.

2. A water-filter, consisting of a tank provided with an inlet and outlet, screens contiguous to the inlet and outlet, a mass of filtering material confined between said screens, oscillatory shafts journaled in said tank, in bearings located between the screens, one shaft being located nearer one screen than the other, and said shafts being provided with radial agitator-arms, levers applied to said shafts, and one of said levers having a handle, and a link connecting said levers, substantially as set forth.

In testimony that I claim the foregoing as my invention I have signed my name in presence of two subscribing witnesses.

SEATON M. BOYER.

Witnesses:
PAUL GOEPEL,
M. H. WURTZEL.